Jan. 26, 1965 J. RABINOW 3,167,744

OPTICAL MASK READING MACHINE

Filed Aug. 23, 1961 3 Sheets-Sheet 1

INVENTOR
Jacob Rabinow
BY Joseph A. Genovese & Max L. Libman
ATTORNEYS

OPTICAL MASK READING MACHINE

Filed Aug. 23, 1961 3 Sheets-Sheet 2

INVENTOR
Jacob Rabinow
BY Joseph A. Genovese & Max L. Libman
ATTORNEYS

INVENTOR.
Jacob Rabinow
BY Joseph A. Genovese &
Max L. Libman
Attorneys

United States Patent Office 3,167,744
Patented Jan. 26, 1965

3,167,744
OPTICAL MASK READING MACHINE

Jacob Rabinow, Takoma Park, Md., assignor, by mesne assignments, to Control Data Corporation, Minneapolis, Minn., a corporation of Minnesota Filed Aug. 23, 1961, Ser. No. 140,966
13 Claims. (Cl. 340—146.3)

This invention relates to character recognition machines and particularly to optical reading machines. The application is a continuation in part of the now abandoned application Serial Number 107,135.

*Background*

The term "character" as used herein means letters, numbers, symbols, words, patterns, pictures, prints and/or any other manifestation capable of being represented by an optical mask, in whole or part.

In recent years the development of character recognition techniques by machine has been intensified. One of the reasons is that modern computers are capable of assimilating information at speeds far in excess of current methods of feeding data to the computers. Optical reading machines can be made to function at much higher speeds than the usual punch card, tape, etc., systems used as computer inputs.

In general, it seems that most effort in the development of reading machines has been directed toward character recognition by analysis, curve tracing and matching techniques where the character (usually its image) is compared to a memory of the entire family of which the character is a part. This system is often referred to as "map matching."

The J. Rabinow U.S. Patents Nos. 2,795,705 and 2,933,246 disclose reading machines using optical masks to aid in the recognition of characters. There are other patents disclosing machines where the image of a character is projected onto a series of masks to provide outputs which are a function of the degree of match between the character image and the masks. My present invention deals principally with this class of machine.

Before the invention of my scan comparison machines referred to above, optical map-matching machines used single shot comparison and all suffered from the fact that they could not separate characters which were different in a small part of their total area. That is, like Q and O, M and N and so on. Scanning the examination of an optical match, eliminated this trouble, because even small differences gave very large signals which enabled characters to be separated without too much difficulty. This was done, however, at the cost of time. The scanning map-matching machine consumes considerable time and requires fairly complex equipment so that while a single shot comparison can conceivably be made in one microsecond, separation of comparison field or area into hundreds of elements of length requires time in about that proportion, if it is assumed that each element can be seen in a microsecond. If each element can be examined faster, of course, the ratio still holds, and presumably the whole character can be examined faster also.

Another difficulty has always been the problem of vertical and horizontal registration in optical matching machines. One of these directions can be handled by the motion of the paper, for example, if the paper is moved from left-to-right or right-to-left, then the resulting registration must occur correct sometime or other. But if it must occur at the same instant as vertical registration, the problem becomes very difficult, and this is quite true in a converse case. There are, of course, solutions to this problem for example disclosed in my prior Patent No. 2,795,705 and the Brice Patent No. 2,240,545. Use of multiple masks has been disclosed previously, and unfortunately their use has been at the cost of additional equipment, essentially consisting of sensitive parallel reading machines. It is obvious that single optical comparison technique has a very great many advantages because the logic of the machine is essentially in the mask, and it is a fact that if a single match can be done at very high speeds, multiple looks at the unknown character are feasible even at relatively high speeds. The problem then resolves itself into being able to separate characters with small differences by optical matching. This invention is a solution to this problem and its main purpose is to provide the capability to separate characters even when the differences between them are quite small.

It should be understood that although most of the following description will be concerned with the explanation of dark characters and light background, this is only because this is the ordinary problem. The system is equally well adapted to separating light characters and dark background as for example in transparency records such as microfilm. It should be understood, of course, that the masks would then be the converse of those normally used, and the logic would be suitably arranged to pick up small differences which, in this case, would be differences in the transparent portion of the microfile record.

Another problem encountered in most reading machines and especially those of high resolution, is brought about by poor print. A large amount of print, and especially typewriter print, is fuzzy at the edges. When an ordinary scanner is used, the ill-defined edges of the character are detected, providing very poor information on which to base a decision regarding the identity of the character.

*Objects and features*

An object of my invention is to provide such improvements in optical mask reading machines as to enable the machines to recognize characters accurately and at high speeds by overcoming the above mentioned difficulties.

I accomplish this by using a "single look" scanner in combination with an optical mask system. Thus, by eliminating piece-by-piece scanning I gain a considerable amount of time. Of course, "single look" scanning of itself is not new, but as I use it in combination with optical masks, it enables me to provide economical solutions to many of the above problems. For instance, it is not necessary for me to use multiple masks of the same character as a solution to the vertical registration problem. Instead, I have more than enough time to examine a line of characters many times, by moving the document small distances with respect to the single look scanner. In other words, I can examine an entire line of print many times and at slightly vertically displaced positions.

An optical mask, non-scanning machine does not have so critical a difficulty with fuzzy print. The reason is that the transparent windows of the opaque masks examine the entire character and not just elemental sub-areas thereof. The mask windows may be made narrower than the average width of the projected image of the fuzzy character. Thus, even though a fuzzy character is projected onto the mask, the window does not see the ragged edges; it sees only the clearly defined central region of the image elements of the characters. In a sense the optical mask window may be used to clip the character image along its edges.

A very important object of my invention is to provide a mask system for optical mask reading machines which has general application. In explanation, an analysis of the numerals and letters which we use, will indicate that they are in several families, for example curves such as the O, G, Q, etc., and straight lines (capital M, N, W, etc.) and combinations of the two. Many of the characters have common features, meaning that they are distinguishable only by the non-common features. Consequently, the masks may be made to favor the differences between characters. Also, I provide a mask-sharing principle where one mask may be used for the identity of two or more characters. For example, one mask may have a window or windows conforming to the common features of several characters, such as the vertical elements of the N, M, and H. Other masks having windows conforming to the elements distinguishing these characters from each other are used with the single mask to identify the characters M, N and H. Mask-sharing is also possible to distinguish a character from all others of a sub-group which may give rise to ambiguities. For example, in a particular font, it may be easy for a machine to distinguish the N from all characters except the N, H and U. According to one form of my invention, I would have an N mask and another mask whose windows conform to those features of the M, H and U which distinguish the N from the M, H and U. The logic is that the N is identified as such if the N mask window sees the image of the N and the additional mask windows (called "negation" mask) see no part of the image. The negation mask has the effect of comparing the N to all other reasonably similar characters. Those characters which are not reasonably similar need not be accounted for in the negation mask because the direct image-comparison made with them will not provide a high enough correlation to be concerned with. Since the negation mask has a composite of (and/or separate) negation windows, the number of individual masks required is reduced. This is an important feature because there is a limit (due to light attenuation) to the number of useful images that can be made of a single character, and each time that a mask is eliminated, a phototube with its associated circuit is also eliminated.

Another feature of my mask system materially simplifies the recognition of characters which contain all of the intelligence of other characters. If the image of the character E is projected on a mask for the character F, all intelligence points of the F mask will be satisfied and the machine could not easily distinguish between the F and E. It is obvious that this problem has been solved in certain reading machines. Some machines require a change in font so that the image of an E will not satisfy all points of the F recognition means.

A more satisfactory solution to this problem is described in Patent No. 3,104,369 of J. Rabinow et al. The solution disclosed "assertion" and "negation" procedures. In general, an assertion is an output indicating that an element of a character exists where it is expected. A "negation" is an output indicating that no feature of the character exists at a station where none is expected. Philosophically, the F is identified by the following intelligence: The unknown characer has a vertical element, an upper horizontal element, an intermediate horizontal element, and no element (negation) at the lower horizontal station. The fact that no character element appears at the lower horizontal station is just as important as the existence of the character features at the other stations.

A principal object of my invention is to provide assertions and negations, and particularly the latter, in an optical mask system, where this information is developed at the masks themselves, and used to distinguish each character from all others that the machine is designed to identify.

The above mentioned patent also fully describes the "weighting" technique which emphasizes, by electrical means, certain features of various characters which are important in their recognition. A feature of my present invention is to lend this same kind of emphasis to elements or features of characters which are more important than other features in distinguishing between characters. Assuming that I use opaque masks with the intelligence portions transparent (or open) I establish a weighted portion by applying a gray mask to a portion of the transparency when a part of the character is to be emphasized with respect to another part thereof. I may also establish weighting electronically in combination with optical weighting to further improve reliability of the results.

It is difficult to program a curve tracing or map matching machine to recognize characters of different fonts. Such "programming" actually requires substitution or drastic adjustment of a large complex of electronic circuitry. It is considerably less expensive to "program" my optical mask machine since I need only to substitute a set of masks (which can be a single composite mask) and change some simple electrical circuits, e.g., by merely changing plug boards.

Other objects and features of importance will become apparent in following the description of the illustrated embodiments of the invention.

Figures 2, 2A, 3:
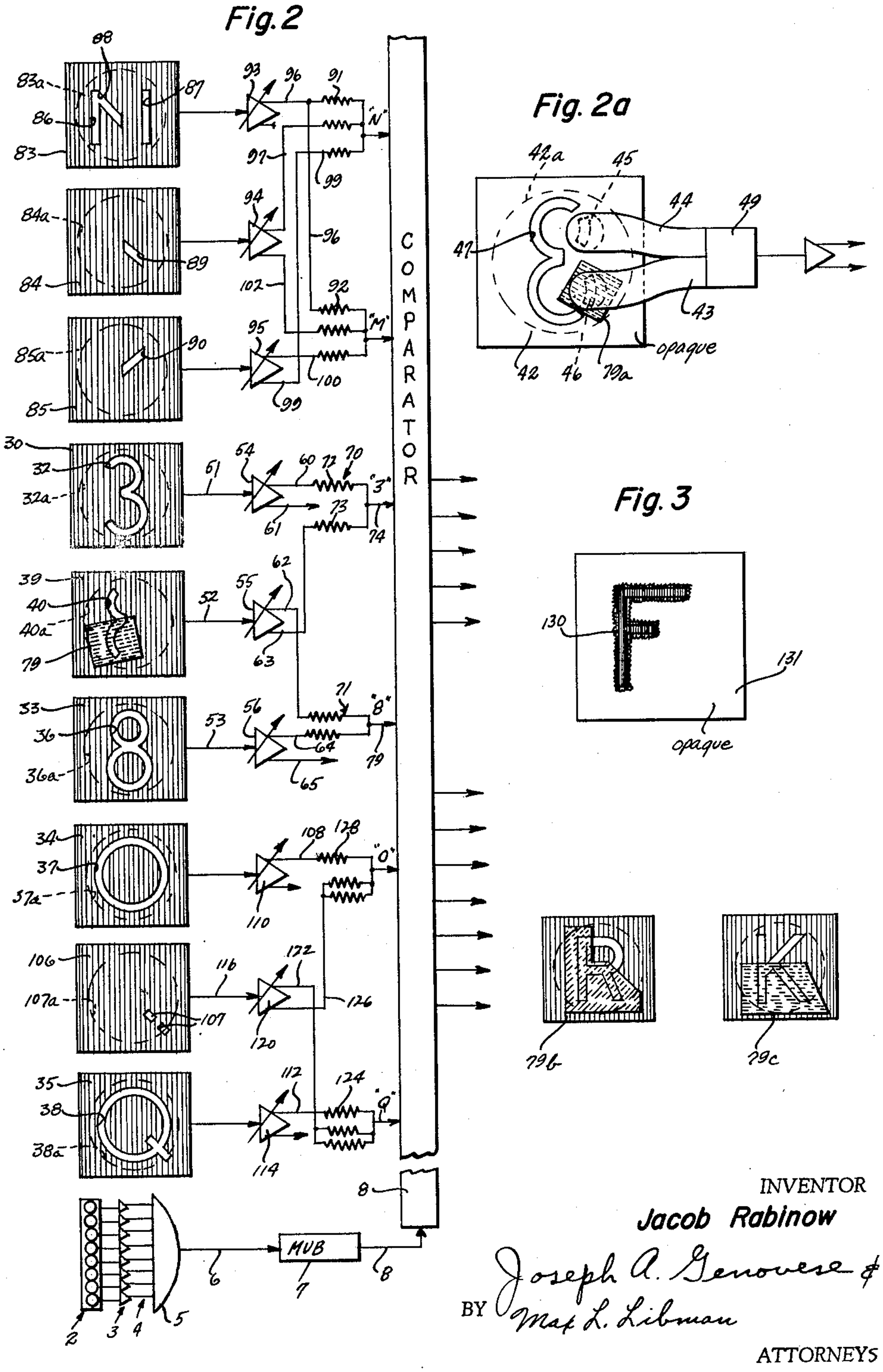
FIGURE 2 is a diagrammatic view showing selected masks of the group in FIGURE 1 and showing how the transduced outputs from the masks are used in the recognition of characters.

FIGURE 2*a* is a fragmentary view showing a modification using optical fibre light pipes.

FIGURE 3 is a diagrammatic view showing how some print appears when greatly magnified, and also showing how a mask can be made to ignore the fuzzy edges of the character.

Figure 4:
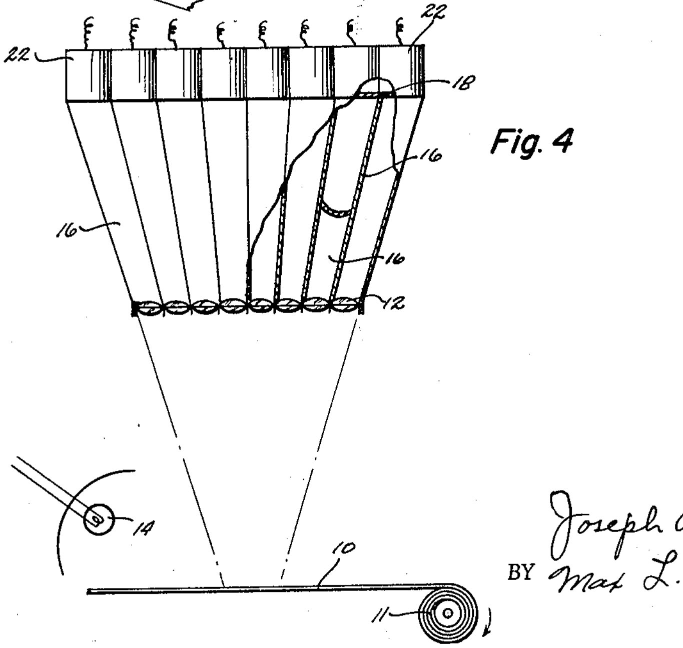

FIGURE 4 is a sectional view showing light baffles between the lens system and masks to prevent the light rays defining the individual images from overlapping.

Figure 5:
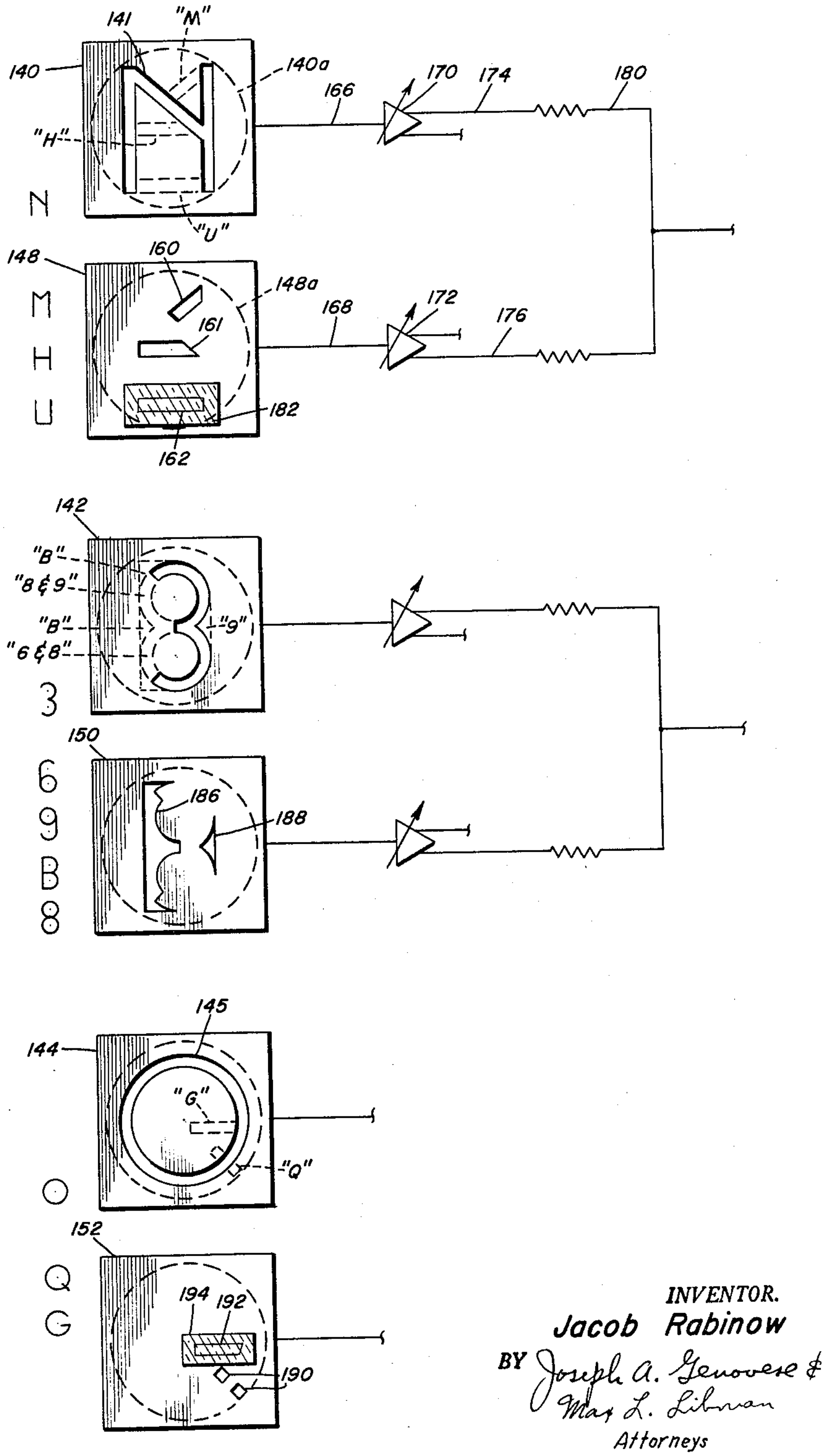

FIGURE 5 is a fragmentary view showing how I may use only two optical masks to distinguish a character from all others which the machine is likely to confuse therewith.

Figure 1:
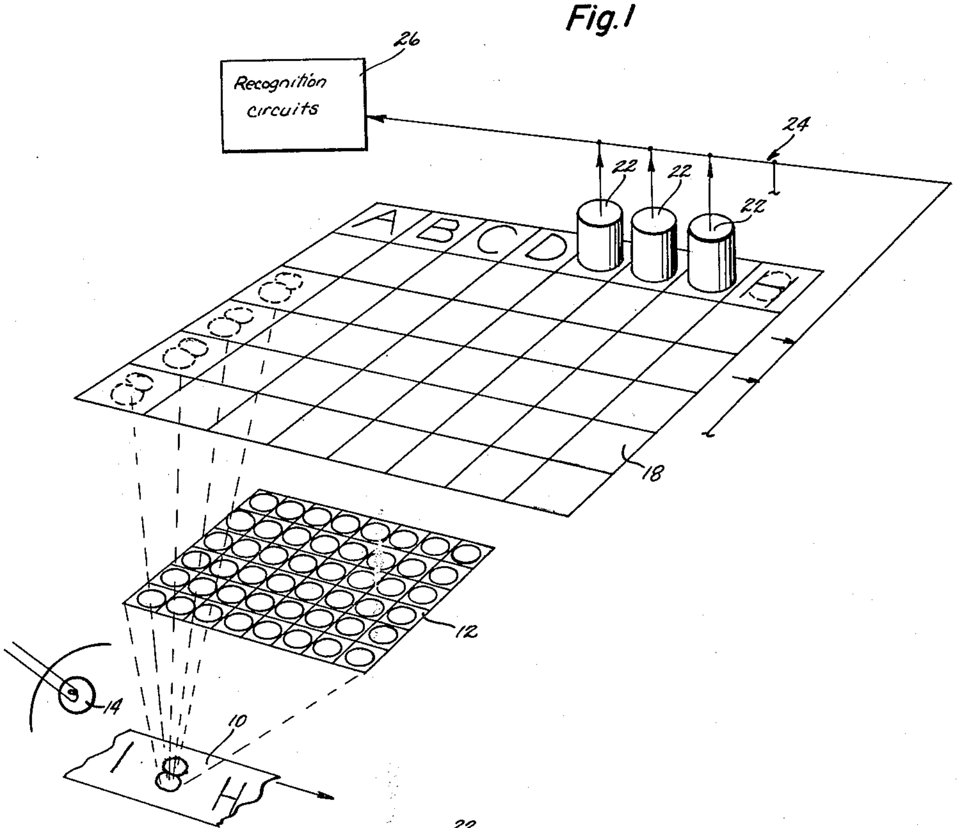
FIGURE 1 is a diagrammatic perspective view of a system embodying the invention.

In FIGURES 1 and 4 I have shown document 10 being moved with respect to a lenticular grid 12, although a beam splitter such as shown in the Rabinow Patent No. 2,931,046 is equivalent. Document 10 may be in any form, for instance pages, a strip, cards, etc. Thus, the transport 11 for the documents will be varied to suit the document configuration. To simplify the disclosure, it is assumed that the document is light colored or white, and the characters are in dark print. The surface of the document is illuminated by a light source 14 so that the reflected images of the characters, and portions of the white background appear on all of the lenses of grid 12. Light baffles 16 from the lenses to a group 18 of masks (FIGURE 4) prevent the light rays defining the individual images and their background, from overlapping on the masks. While the baffles are shown as simple partitions, it should be understood that, in order to reduce reflections, the surfaces are suitably roughened and blackened. Many types of light baffles are well known and need not be described here.

Although FIGURES 1 and 4 show a direct reflection from the document 10 to the lens grid 12, a character or line-scanning projection system using mirrors or other optical devices may be interposed in the optical path between the document and grid 12. Various forms of suitable optical projection systems are disclosed in Patent No. 3,142,224.

The mask assembly 18 is composed of a number of individual masks. There is one lens in grid 12 for each optical mask, and the lenses simultaneously project images of the character being investigated onto a surface of all masks of assembly 18. As indicated previously, the specific forms of the masks constitute an important part of my invention and will be described in detail later. However, the specific locations of the masks is not important. For example, they may be in a single plane as shown in FIGURES 1 and 2, or they may be arranged end-to-end in an arc or in a circle, the latter arrangements being particularly good if a beam splitter such as in the Rabinow patent is used in place of the lens grid 12. Considering now the general system, it is sufficient to note that each mask has one surface on which the image of a character is projected, and that there is a photosensitive device to examine the light passing through each mask. FIGURES 1 and 2 show photomultipliers 22 located behind the individual masks. The photomultipliers have automatic voltage control circuits or have their gain adjusted in some other way so that they are well equalized when clear paper is observed.

Diagrammatically shown electrical network 24 is connected with the output terminals of the photomultipliers and recognition circuits 26. Thus, the photomultipliers simultaneously examine the light passing through the masks as an image of one character is projected thereon. The outputs of the photomultipliers are electrical signals which furnish the information necessary to identify the character under investigation.

Summarizing to this point, it is assumed that the document 10 moves horizontally, and an image of each character is projected by the lenses of grid 12 onto each mask of assembly 18. The intelligence detected by the photomultipliers is transduced to electrical signals and applied to recognition circuits so that a decision as to the character identify may be made.

*Optical mask system including masks 30, 33 and 39*

An optical mask recognition system, in general, can use both negatives and positives of the images to be examined. Because, in most cases, I wish to recognize dark characters on a light background, I generally use opaque masks and transparent portions corresponding to the characters.

It should be recognized that a "negative" mask is, in reality, a portion of a positive of the character. A whole positive mask may, in fact, be used as a negative mask with each negative or "assertion" mask, but the area of "white" is usually so large relative to the "black" of a character that I prefer to use selected portions of the white area for "negative" information. If the characters being examined have wide lines, making the "white" area smaller in comparison, then the use of total positive masks may be desirable. But even here, the area examined should be kept to a reasonable minimum so as not to include neighboring characters and other extraneous information. A positive mask will transmit a maximum amount of light when the character being examined coincides with the mask, or when the character is totally included in the mask. For example, an "F" will be totally included in the positive "E" transparency (as well as, of course, in its own "F" mask). The "F" however, will not cover completely the negative "E" transparency, and this difference in the output of different masks enables the machine to determine the character. Each mask of group 18 is therefore, generally opaque, except for the intelligence developing transparent (or open) portions which I shall call "windows." It is important to remember that the masks illustrated in FIGURES 2, 2*a* and 5 do not form the complete mask system 18 shown in FIGURE 1. The illustrated masks are those used to identify characters of sub-groups where the characters making up the group are difficult for reading machines to distinguish. Also I show more than one way to distinguish certain characters, and where this is the case, the mask techniques involved are, of course, optional. For instance masks 30, 33 and 39 of FIGURE 2 may be used to distinguish a "3" and an "8." Masks 142 and 150 also distinguish a "3" and "8" (and also a "6," "9" "B.)" Either set (masks 30, 33, 39 or 142, 150) may be used. The same applies to the group of masks 83, 84 and 85 regarding the 'U" and "N." Masks 140 and 148 distinguish the "N" from not only the "M," but also, from the "H" and "U." The different groups of masks are shown and described because they develop character-identity logic in slightly different ways.

Consider now, masks 30, 33 and 39. Mask 30 for the numeral "3" is opaque except for its transparent window 32 in the form of a "3." Mask 33 is also opaque except for its window 36 in the shape of an "8." These masks are called assertion masks. Mask 39 has a window 40 whose location and shape conforms to the left part of the "8" window 36, which, when added to the "3" window 32 would form an "8." This mask is called a negation mask.

It is assumed that there would be no ambiguity, other than between the "8" and "3" when the machine attempted to identify the image of an "8" projected onto all masks of the machine. Thus, the masks 30, 33 and 39 will distinguish primarily between the "8" and "3." This is a reasonable assumption for a reading machine designed to recognize numerals only, where no other numeral mask would provide an ambiguity when the "8" image is projected thereon. Thus, in effect, we compare the image of the "8" to all character masks of assembly 18, but need only be especially concerned with those which will produce an ambiguous result. It will later be shown in connection with FIGURE 5, that the problem of distinguishing each character from all other of the machine can be more complex since several characters may be involved. FIGURE 1 shows the character "3" being investigated. An image of this character is projected on all masks of group 18. The images being discussed are those projected on mask 30 (FIGURE 2), on mask 39 and 33. If the image of the character "3" is in registry with window 32, the photomultiplier 32 (of group 22 and FIGURES 1 and 4) behind mask 30 will see little light because the image of the character superimposes directly on and covers the window. Since little light is arranged to produce large signals and vice versa, photomultiplier 32*a* produces a large signal in comparison to the photomultiplier behind other masks, for example, the mask for the character H shown in the upper right-hand corner of FIGURE 1. Good registry of the image of the character "3" with mask window 32 would be all that is required to identify the character as a "3" if all other characters of the family were quite different in shape from the character "3" but this is not the case, even in a machine to recognize only numerals. In the "3"–"8" example, when the "8" image is projected onto mask 33, photomultiplier 36*a* behind window 36 will produce a large signal. But so will the photomultiplier 32*a* behind window 32 because the image of the "8" will cover the entire window 32.

Negation mask 39 and its associated photomultiplier 40*a* circuitry solves this problem. Mask 39 has window 40 which, if superimposed on mask 30 would combine with window 32 to form a window identical to the "8" window 36. Actually, I need not have window 40 conform precisely to the missing part of the "8" mask window which would make it identical to a "3" window. For instance, window 40 may be in the form of two crescents or rectangular windows (see FIGURE 2*a*). The negation mask 39 provides intelligence in the determination of the character "3" because the image projected onto mask 30 covers window 32, but that does not cover window 40. When the image of the character "3" is projected onto mask 36, this image will not satisfy the negation, i.e., "not" appearing on window 40 of mask 39. The circuits using this intelligence are described later.

FIGURE 2a discloses one of my several methods of reducing the number of required optical masks. Mask 42, its photomultiplier 42a together with light pipes 43 and 44 and photomultiplier 49 replace masks 30 and 39 and their photomultiplier 32a and 40a. The negation windows 45 and 46 are included directly in mask 42 which also contains the intelligence window 47 corresponding to window 32. Light pipes 44 and 43 are in registry with the negation windows 45 and 46 and conduct the light to photomultiplier 49 which corresponds to photomultiplier 40a behind mask 39.

Regardless of the system used, i.e., separate assertion and negation masks or combined function masks as shown in FIGURE 2a (or FIGURE 5 as later described), the assertion and negation intelligence is developed at the masks. This intelligence is transduced to electrical signals by the photomultipliers and fed to circuits which are diagrammatically shown at 24 and 26 in FIGURE 1, and shown in more detail in FIGURE 2.

The "weighting position" technique disclosed in Patent No. 3,104,369 lends greater emphasis to certain character elements or features which are important in distinguishing between characters that are quite similar. The above patent describes electronic means to establish weighted positions. Weighted positions are established in my present invention at any mask assembly by providing gray masks over portions of appropriate windows. The precise operation of this weighting technique is described later. It is mentioned here because it is a part of my optical mask system.

*Recognition circuits*

The network 24 is composed of a number of conductors, for instance lines 51, 52 and 53 connected to the output terminals of photomultipliers 32a, 40a and 36a. These outputs are applied to amplifiers 54, 55 and 56 whose gain may be adjustable (optional) to match the photomultipliers or adjust them to provide different outputs with respect to each other should this be desired. Each amplifier has two outputs termed "assertion" and "negation" outputs respectively. The outputs swing around an arbitrary reference, for example zero volts. To facilitate explanation, assume that when a photomultiplier sees "white," i.e., the character backgrounds of a projected image, the assertion output is negative (−6 volts), and the negation output is positive (+6 volts). When the photomultiplier sees less than a certain level of light, i.e., black (no light at all) or very dark gray, both of which will be termed "black," the assertion output is +6 volts and the negation −6 volts. My optical mask system is inherently an analog system, meaning that the output of each photomultiplier and its amplifier is a function of the amount of light which the photomultiplier sees. Thus, if only part of window 32 (FIGURE 2) is covered with an image of a character, the remaining part will see a part of the image (black) and a part of the character background (white). Accordingly, amplifier 54 will have output signals on assertion and negation lines 60 and 61 respectively, which are proportional to the amount of light seen by the photomultiplier. The "R" and "K" masks shown to the right of FIGURE 2 have superimposed gray masks of different optical densities and covering portions of windows of different characters to emphasize differences between portions of characters other than the "3" shown in FIGURES 2 and 2a. These masks also show that the optical density of the gray mask may be selected from the entire gray scale.

Let us now examine more closely the logic followed in concluding that the character "3" (FIGURE 1) is actually a "3" and not an "8." The same logical process is followed in determining that the character "3" is not any other character. Assume that the image of the "3" fully covers window 32. Photomultiplier 32a sees no "white," i.e. very little light. Thus the signal on line 51 is highly positive, assume maximum. This means that the signal on the assertion wire 60 of amplifier 54 will be correspondingly maximum positive (+6 volts) and the signal on the negation wire will be maximum negative (−6 volts). Since the image of the "3" on mask 39 does not cover window 40, the photomultiplier 40a sees the white background of the character. Consequently the signal on line 52, applied to amplifier 55 is negative. Thus, the assertion signal on line 62 of amplifier 55 is correspondingly negative, whereas the signal on negation line 63 is positive. When the image of the "3" appears on mask 33, photomultiplier 36a sees some light, and considering the proportions of the areas of windows 32 and 36, assume that the signal on line 53 from photomultiplier 36a is such that the amplified outputs are plus and minus one volt respectively. Therefore the signal on line 64 will be positive but small, and the signal on line 65 will be negative but small.

I summarize the signals on lines 60, 62 63 and 64 by using resistor matrices 70 and 71. The matrices are similar in function to the correlation resistor matrices disclosed in Patent No. 3,104,369. Matrix 70 is for the "3" voltage whereas matrix 71 is for the "8" voltage. In the example under consideration, wire 60 conducts +6 volts to its resistor 72 in matrix 70. Wire 63 also conducts +6 volts to resistor 73 of matrix 70. Therefore the voltage on output line 74 of matrix 70 will be optimum (+6 volts) in the given example. Now consider what the matrix 71 experiences when the image of the "3" is projected on mask 33. The line 53 conducts a small positive voltage. Therefore, the assertion wire 64 conducts only a minor positive voltage. In addition, I have connected the assertion wire 62 from the amplifier of photomultiplier 40a to the resistor matrix 71, and it conducts a large negative voltage to matrix 71. Thus, the signal on line 79 from matrix 71 will be a large negative voltage. All voltages on all of the matrix output lines for all of the characters are summarized by comparator 80 which seeks the highest positive voltage as the optimum voltage. The voltage comparator is costructed like the comparator shown in a Patent No. 3,104,369. As between the "8" and the "3," my optical system will select the "3" when the "3" is projected onto the masks of mask assembly 18.

The comparator 80 may be of the type which seeks a predetermined voltage level (for example +5 volts) on any of its input lines 74, 79 and the like. When that level is obtained on any input line, the comparator will identify the character. This system has some inherent disadvantages, but may be used if the voltage levels on lines 74, 79, etc., are high and reliable when the character images are in registry with the masks. Another method is similar to that disclosed in copending application Serial No. 115,267, of Arthur W. Holt, where capacitor charges representing character-identity are continually available to the comparator, but the comparator is triggered at the end of the character. An analogous system is shown at the bottom of FIGURE 2, where a trigger signal developed at a vertical column 2 of photocells is amplified at 3. Lines 4 from the amplifiers conduct signals to AND gate 5. The photocells provide outputs when they see "white" and none when they see a part of the character images. Gate 5 is satisfied only when all of its "white" inputs are provided simultaneously, which occurs when column 2 is seeing the clear space between characters. Gate 4 will then yield a signal on line 6 to operate a signal generator, i.e., a one-shot multivibrator 7 whose output on line 8 is the "read" trigger signal for comparator 80. The geometrical relationship between photocell column 2 and the windows of all masks are so arranged that the character images are exactly registered with the mask windows (see FIGURE 3) before the time of the "read" trigger.

Now consider another example of identifying the characters. Assume that an "8" is being examined and its images are projected onto masks 30, 33 and 39. The image of the "8" fully covers the window 32 so that line 51 conducts maximum positive voltage. The image of the "8" also fully covers window 40 so that line 52 also conducts maximum positive voltage. However, negation wire 63 of amplifier 55 is connected with the "3" matrix 70 (as previously described), and it is highly negative when the photomultiplier 40*a* behind window 40 of mask 39 sees little light. Since a part of the image of the "8" covers window 40, line 63 will be highly negative and the summarizing matrix 70 will provide a comparatively weak output signal on line 74. On the other hand, line 53 from the photomultiplier 36*a* behind mask 33, is highly positive. Thus, assertion line 64 conducts a large positive signal to its resistor matrix 71. Since a part of the image of the character "8" covers window 40, line 52 is also highly positive. As shown, assertion wire 62 associated with photomultiplier 40*a* is connected to matrix 71. Thus, both inputs to matrix 71 are a high positive level, yielding a large positive signal on line 79 to comparator 80.

I previously referred to "weighting positions" by gray (semitransparent) masks, e.g., at 79 and 79*a* in FIGURES 2 and 2*a* and at 79*b* and 79*c* to the right of FIGURE 2. The gray masks, diagrammatically shown as separate masks 79 and 79*a*, cover a portion of window 40 and window 47 respectively. With the gray masks, even though a window sees the "white" there will be some output from the photomultiplier associated with that window, just as though a gray image were projected onto the masks 39 or 42. Since the gray masks cover only a portion of the windows, they have the effect of emphasizing one portion thereof as opposed to another portion. This emphasis is reflected in the value of the resulting signals, for instance on lines 62 and 63 from amplifier 55, and these are summarized as a part of the total inputs to matrices 70 and 71. In this case, the top of the mask will have greater effect on the signals than the bottom, which is partly "opaqued." Masks 79*b* and 79*c* show that the optical density of the gray masks may be judiciously chosen. Patent No. 3,104,369 discloses a weighting by electrical means, and that disclosure is incorporated herein by reference. I may use electrical weighting. Thus, I have shown double resistors in matrices 124 and 128 (to be described later). Here again, the double resistors are paired in parallel simply to show a selection of resistor value, and in actual practice I would more than likely use one resistor of a predetermined value to electrically obtain "weighting."

*Remaining optical masks*

Masks 83, 84 and 85 disclose further my mask-sharing technique, although mask 39 is also actually shared in determining the identity of the characters "3" and "8." The difference is that masks 83, 84 and 85 show how the characters M and N may be distinguished from each other without using any mask containing all of the intelligence of either of these characters. Mask 83 has windows 86 and 87 corresponding to the left vertical features, respectively, of the character M and N. This mask also has window 88 corresponding to the part of the intermediate feature which is common to both of these characters. Mask 84 has window 89 which corresponds to the lower part of the diagonal peculiar to the letter N. Mask 85 contains a window 90 which corresponds to the upper right diagonal element peculiar to the character M. Resistor matrices 91 and 92 for the N and M respectively, summarize the outputs of amplifiers 93, 94 and 95 which are fed by the photomultipliers 83*a* 84*a* and 85*a* behind masks 83, 84 and 85. The logic is as follows: The intelligence collected by the photomultiplier for mask 83 added to the intelligence of mask 84, will yield the character "N" provided that the window 90 of mask 85 sees such light. The intelligence derived from mask 83 plus that from mask 85 will yield the character "M" provided that mask 84 conducts much light. The intelligence derived from mask 83 plus that from mask 85 will yield the character "M" provided that mask 84 conducts much light. Specifically, resistor matrix 91 is fed by line 96 which is the assertion wire of amplifier 93. This means that when the image of a character covers windows 86, 87 and 88 of mask 83 a maximum positive signal is conducted on assertion line 96. Line 97 which is the assertion wire of amplifier 94 is also connected to a resistor of matrix 91, together with the negation developed from amplifier 95 on line 99. Thus, to obtain a high positive voltage from matrix 81, the photomultipliers 83*a* and 84*a* behind masks 83 and 84 must see little light (the character image), whereas the photomultiplier 85*a* behind mask 85 must see a great deal of light (the character background).

For the letter N the same assertion wire 96 is used, plus the assertion wire 100 from the amplifier 96. It logically follows that I should use the negation wire 102 from the photomultiplier amplifier of mask 84, so that the voltage summarizing at matrix 92 will have a signal component indicating that there is no character feature at the window 89 of mask 84.

I have shown masks 34, 35 and 106 to explain the importance of a single feature in the determination of the identity of a character. The masks are for the "O" and "Q" respectively. When the image of the character "Q" is projected onto mask 34, it will fully cover the window 37 of the "O" mask. Consequently, the assertion wire 108 from amplifier 110 (connected with photomultiplier 37*a* behind mask 34) has a maximum positive signal. The same character is also simultaneously projected on mask 35, completely satisfying window 38 so that the assertion wire 112 from amplifier 114 of photomultiplier 38*a* also conducts a maximum positive signal. The way that my map-matching machine can practically distinguish between the "O" and the "Q" is to study the tail of the "Q." For this, I use negation (or emphasis) mask 106. The photomultiplier 107*a* behind window 107 of mask 106 provides an output on line 116 which is fed to amplifier 120. Thus, for the character "Q" photomultiplier 107*a* examines the small tail at the lower right corner. Hence, the assertion wire 122 from amplifier 120 is fed to the "Q" matrix 124, and the negation wire 126 from amplifier 120 is fed to the "O" matrix 128. The operation of the matrices 124 and 128 in summarizing the voltages is the same as described in connection with the previous examples.

Attention is now directed to FIGURE 5 showing subgroups of masks 140 and 148; 142 and 150; 144 and 152. The purpose of this figure is to point out solutions to certain problems encountered in a powerful machine, e.g., a machine to recognize the letters of the alphabet and the numerals. There are sub-groups of characters, such as shown by legend to the left of FIGURE 5, which have small differences, and for the machine to be practical, it must distinguish each character from every other character in the memory of the machine. Only the characters that will be difficult to distinguish are discussed.

Consider first the characters N, M, H and U, and masks 140 and 148. The M and N can be distinguished with masks 83, 84 and 85 (FIGURE 2) using one type of mask sharing. Masks 140 and 148 shown how the "N" can be distinguished not only from the M but also from the H and U, the assumption being that these comprise the only other characters which would be likely to give rise to ambiguities. If there are others, mask 148 would be designed accordingly as described below for the H, U and M. Assertion mask 140 has its window 141 in the form of an N. Negation mask 148 has windows 160, 161 and 162 corresponding to parts of the M, H and U respectively, which distinguish the "N" from these characters. Pickup devices 140*a* and 148*a* behind their masks provide output signals (when an image is projected onto the masks) over lines 166 and 168 which are amplified at 170 and 172. I connect the assertion wire 174 of amplifier 170 and the negation wire 176 of amplifier 172 to matrix 180 to summarize the signals just as described in detail in connection with FIGURE 2. Consequently, the logic is that the unknown character is identified as an N, when mask window 141 is covered, and when windows 160, 161 and 162 are not covered. If it is desired to emphasize one or more of the features of a character (or portions thereof, in comparison to others) the gray mask 182 may be applied to the mask 148 exactly as described in connection with other forms of my mask system. Mask 148 shows another method of mask sharing in that mask 148 has windows corresponding to several characters. In fact, the intelligence developed by masks 140 and 148 has the effect of comparing the image of the "N" to all other significant characters, i.e., those that could possibly provide an ambiguity in the recognition of the "N." Mask 148 serves the same purpose as mask 39 (FIGURE 2), except that mask 148 is a composite of the other characters likely to be confused with the N.

Masks 142 and 150 are for distinguishing the "3" from the 6, 9, B and 8. Window 143 is in the form of a "3," while windows 186 and 188 in negation mask 150 are composited for the features and pieces of the 6, 9, B and 8 by which the "3" is distinguished therefrom. I have shown in dotted lines on mask 142, pieces of the characters 6, 9, B and 8 to show how they would combine with window 143 to form these characters. Window 186 is in a position end of a shape to include a number of features and/or pieces of the characters of this group. The operation of the circuit is identical to the circuit for masks 140 and 148. Masks 142 and 150 effectively compare the image of the "3" to all other characters by selecting those likely to cause ambiguity and negating the characteristic pieces thereof, i.e., deciding that an unknown character image is that of a "3" because mask window 143 is satisfied, and windows 186 and 188 see no part of the character image.

Masks 144 and 152 are for the O, Q and G. Compare these to masks 34, 35 and 106 (FIGURE 2) for only the O and Q. It is seen that only two masks 144 and 152 are required for identifying three characters.

Window 145 is in the shape of an O and I have shown in dotted lines the Q and G distinguishing features identified by legend. Windows 190 and 192 (with one emphasized over the other by a gray mask 194) corresponding to these features are in negation mask 152. Thus, with circuitry the same as for masks 140 and 148, the image of an unknown character is concluded to be an "O" when the image covers window 145 but does not cover windows 194 and 190.

The magnified image of the character F in FIGURE 3 shows how fuzzy characters often are, when printed by ordinary means. Machines which scan in the usual sense, detect the great irregularity at the edges of the character. An optical mask can be made to ignore the fuzzy edges of the character. The window 130 of mask 131 is narrower than the extremes of the blurred edges of the character. Consequently, the portion of the character image seen by the photomultiplier through the window 130 does not possess any or much of the fuzzy edges of the characters.

*Summary*

It has been known for a long time that optical mask reading machines have certain advantages over other types of machines, particularly since most of the "logic" of such machines is contained in a simple and inexpensive multiple mask. However, the disadvantages of optical machines were, in some instances, thought to be overwhelming. These disadvantages are speed limitations, the requirement for precise registration, and the inflexibility of an optical mask machine in recognizing characters where only small differences exist between certain characters. Since I have eliminated element-for-element scanning and have thereby gained a considerable amount of operational time, sufficient for numerous full examinations of an entire line of print, I can examine a character many times and still recognize the characters much faster than prior optical mask machines of which I am aware. The multiple sweeps of an entire line of characters may be made at slight successive vertical displacements with respect to each other so as to detect and recognize all of the characters of a line, even those which are not vertically registered in the line. Thus, vertical registry problems are no longer formidable.

Font-difference flexibility has previously been considered severe. However, since I can use the same mask in the logic of several characters, in a sense duty—share the masks—my present machine can afford to have masks for more characters without overburdening the number of images required to be projected from the document. I realize that an unlimited number of masks cannot be used because of light attenuation and physical space requirements. But a number sufficient for a reasonably versatile machine can be used and, in any case, changing masks and the associated resistor network is a simple problem.

The use of assertion and negation techniques in an optical machine and with the intelligence for the assertion and negation signals developed at the masks themselves seems to be one of the most reliable inexpensive and fastest ways of distinguishing between characters which have only small differences. The various forms of mask-sharing by multiple use of the same mask, addition of features in different masks, and very important, the inclusion of windows corresponding to features of more than one character in a single mask, greatly aids in recognizing the characters and keeping the number of required masks (and their circuits) small. The use of weighting techniques greatly aids my invention. This feature can be used with scanning or non-scanning machines (just as the entire optical mask assembly of my invention), and appears to be important in enabling optical mask reading machines to become far more versatile and practical than they are presently considered.

It is understood that various changes, modifications and alterations may be resorted to without departing from the protection of the following claims.

I claim:

1. An optical mask system for character recognition comprising a set of masks having intelligence areas, some of said areas being in the form of complete characters, other areas corresponding to portions of characters, said portions being significant to determine the difference between certain characters having some common features and at least one distinguishing feature, means to project an image of an unknown character on each of said masks, transducing means for examining the intelligence developed by said mask areas and providing outputs corresponding to the light passing through said masks, electrical means for combining preselected outputs originating from the complete areas and character portions areas, and means responsive to said combined outputs for identifying the unknown character.

2. The system of claim 1 wherein some of the masks and said outputs cooperate to form negations where a negation is defined as a signal indicating that no character feature exists at a given location.

3. The system of claim 1 and means to emphasize a character feature by having at least a part of the intelligence area of the associated mask semi-transparent.

4. In an optical mask system for character recognition, a set of opaque masks having transparent intelligence-developing areas, some of said masks having transparent areas in the form of complete characters, other masks having transparent areas corresponding to portions of the characters, said portions being essential to determine the difference between characters of particular sub groups having some common features and at least one distinguishing feature, means to project the image of an unknown character on all of said masks, transducing means for examining said areas of said masks and providing electrical outputs corresponding to the light passing through said masks electrical means for combining preselected outputs originating from the complete character areas and character portion areas, and means responsive to said outputs for identifying the characters.

5. The subject matter of claim 4 wherein at least one of said other masks combined with said transducing means develops a negation signal where a negation is defined as an output indicating that no character feature exists at a given location.

6. In an optical mask reading machine for characters on an intelligence bearing medium, a group of masks, means to simultaneously project images of an unknown character of said medium onto all of said masks so that said masks examine the character images by a single investigation of the entire character image, transducing means associated with said masks to provide electrical output signals corresponding to the light which passes through said masks, each mask having at least one information developing area some of said masks being duty-sharing by having one mask contain features common to more than one character, and other masks associated therewith having intelligence areas which, when added to the features of said one mask, provide sufficient intelligence to identify more than one character, some of said masks having areas representing negations of character elements, other of said masks having intelligence areas to develop assertion information regarding the unknown characters, means for uniquely combining the outputs regarding the assertion and negation intelligence-developing areas to provide character identity signals on the basis of information indicating that features of certain characters exist where expected and information indicating that no features appear at locations where none are expected.

7. An optical mask reading machine for a family of characters where the characters are on an intelligence bearing medium, means for projecting a plurality of images on an unknown character which is on said medium, a group of masks, one of said images being projected on each mask so that each mask simultaneously investigates the image of a single character, a plurality of photosensitive pick-up devices, said devices arranged to examine said masks and provide electrical outputs corresponding to the light passing through said masks, each mask being opaque and having at least one intelligence developing window therein, the window of certain of said masks conforming to the configuration of specific characters, the window of other of said masks conforming as to location to certain features of the characters, means operatively connected with said photosensitive means for providing two electrical signals for each photosensitive means, one signal being higher than a predetermined reference and the other being correspondingly lower than a predetermined reference thereby providing assertion and negation electrical signals derived from the intelligence developed at said masks, means for combining unique combinations of said assertion and negation electrical signals based on the presence and absence respectively of features of a character in given locations when the image thereof is projected onto said masks and for providing additional electrical signals proportional thereto by which a decision as to the identity of the character may be made.

8. An optical mask assembly for character reading machines where the characters include at least one sub group whose characters distinguish from each other by small parts, said mask assembly comprising a plurality of masks having intelligence providing portions, a first of said masks having a portion which substantially corresponds to the shape of one of the characters of said sub group and a second of said masks having portions which correspond to said parts of the remaining characters of said sub group which distinguish said one character from the other characters of said sub group, first and second photosensitive means associated with said first and second masks to provide electrical signals corresponding to the correlation between an unknown character and said first and second masks, and combining means to combine the signals of said first and second photosensitive means to provide a new signal on which to base the character-identity decision.

9. In a character reading machine, an optical mask assembly forming the memory of the machine, means to simultaneously project the image of an unknown character onto all of said masks so that the unknown character is compared to each mask, said masks including various combinations thereof representing all of the characters which the machine is capable of identifying, a first mask of one of said combinations having an assertion window in the shape of the unknown character, a second mask of said combination having negation windows corresponding to portions of other characters which are shaped like said unknown but have significant portions which identify them from the unknown character represented by said first mask, transducing means to provide inverted and non-inverted electrical outputs proportional to the light passing through said windows of said first and second masks, and circuit means responsive to said outputs to provide a character-identity signal by combining the non-inverted output corresponding to said first mask with the inverted output corresponding to said second mask whereby the unknown character is identified on the basis of the image covering said assertion window and the image failing to cover the negation windows.

10. In an optical character reading machine to identify characters of a set wherein each character of a group of characters within the set has at least one common feature and a distinguishing feature which distinguishes one character of the group from the others within the group, the improvement comprising a mask assembly, means to project an image of an unknown character on the masks of said assembly, said assembly including a group of masks for said group of characters, said mask-group including a first mask having a window corresponding at least to said common feature of the characters within said character-group, said mask-group also including at least a second mask provided with a window corresponding to said distinguishing feature, photoelectric transducing means optically aligned with said first and said second masks to provide electrical outputs corresponding to the correlation between the image projected on said first and second masks, and means for combining said outputs to provide a new signal on which to base the character-identity decision.

11. The subject matter of claim 10 wherein said photoelectric transducing means optically aligned with said second mask provides a pair of complemental outputs which respectively indicate the presence and absence of a said distinguishing feature so that when one complemental output is combined with the transducing means output associated with the common feature mask the new signal provides information corresponding to said common feature plus a distinguishing feature, and when the other complemental output is used the said new signal provides information corresponding to said common feature and the not-function of a distinguishing feature.

12. In an optical mask system for a reading machine capable of identifying characters of a set, a mask system including a first mask having a window corresponding to a feature common to a plurality of characters of a group within the set, first photosensitive means associated with said first mask to provide first electrical outputs, a second mask having a window corresponding to a feature which distinguishes one character of the group from another, second photosensitive means associated with said second mask to provide second electrical outputs, and combining means to combine said first and said second outputs to provide a new signal on which to base a character-identity decision.

13. The subject matter of claim 12 wherein said second signal has a pair of components, one component representing the presence of character-distinguishing information and the other component representing the not-function thereof so that one character of said group can be at least partially defined when said combining means combine said first signal with one component only of said second signal, and another character of said group can be at least partially defined by using the other component of said pair.

References Cited by the Examiner

UNITED STATES PATENTS 2,985,366 5/61 Scarrott ------------ 235—61.11

MALCOLM A. MORRISON, *Primary Examiner.*